United States Patent
Kang

(10) Patent No.: US 6,320,338 B1
(45) Date of Patent: Nov. 20, 2001

(54) METHOD OF ESTIMATING MOTOR TORQUE CONSTANT

(75) Inventor: Chang-ik Kang, Goyang (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/288,236

(22) Filed: Apr. 8, 1999

(30) Foreign Application Priority Data

Apr. 8, 1998 (KR) .................................................. 98-12451

(51) Int. Cl.⁷ ...................................................... G05B 1/01
(52) U.S. Cl. .......................... 318/430; 318/434; 318/609; 318/610
(58) Field of Search .................................... 318/430–438, 318/455, 609, 456, 610, 800–838; 388/805, 803, 906, 902, 907.5

(56) References Cited

U.S. PATENT DOCUMENTS

| 3,735,226 | * | 5/1973 | Pittner . |
| 4,266,168 | * | 5/1981 | Andersen . |
| 4,767,976 | * | 8/1988 | Mutoh et al. . |
| 5,545,957 |   | 8/1996 | Kubo et al. . |
| 5,602,681 | * | 2/1997 | Nakayama et al. . |
| 5,883,344 | * | 3/1999 | Colby et al. . |
| 5,929,400 | * | 7/1999 | Colby et al. . |
| 5,992,557 | * | 11/1999 | Nakamura et al. . |
| 5,995,710 | * | 11/1999 | Holling et al. . |
| 6,011,370 | * | 1/2000 | Yasui . |
| 6,025,684 | * | 2/2000 | Yasui . |
| 6,043,622 | * | 3/2000 | Shiomi et al. . |
| 6,057,661 | * | 5/2000 | Iwashita . |
| 6,075,332 | * | 6/2000 | McCann . |

FOREIGN PATENT DOCUMENTS

| 2310770 |   | 3/1997 | (GB) . |
| 6-90584 | * | 3/1994 | (JP) . |
| WO 95/05703 |   | 2/1995 | (WO) . |

\* cited by examiner

*Primary Examiner*—Paul Ip
(74) *Attorney, Agent, or Firm*—Robert E. Bushnell, Esq.

(57) ABSTRACT

A method of estimating a motor torque constant including the steps of measuring a current and a speed of motor at sampling time during rotating of the motor and calculating the motor torque constant Kt* by a multiplicity of the measured current values and speed values. Also, the motor torque constant is calculated by the formula $$K_t^* = \frac{\sum_{1}^{N} i(k-1)[v(k) - v(k-1)]}{\sum_{1}^{N} i(k-1)^2}$$

where i(k) and v(k) respectively indicate the current and the speed of the motor at a sampling time 'k', and N indicates a natural number greater than 1.

15 Claims, 2 Drawing Sheets

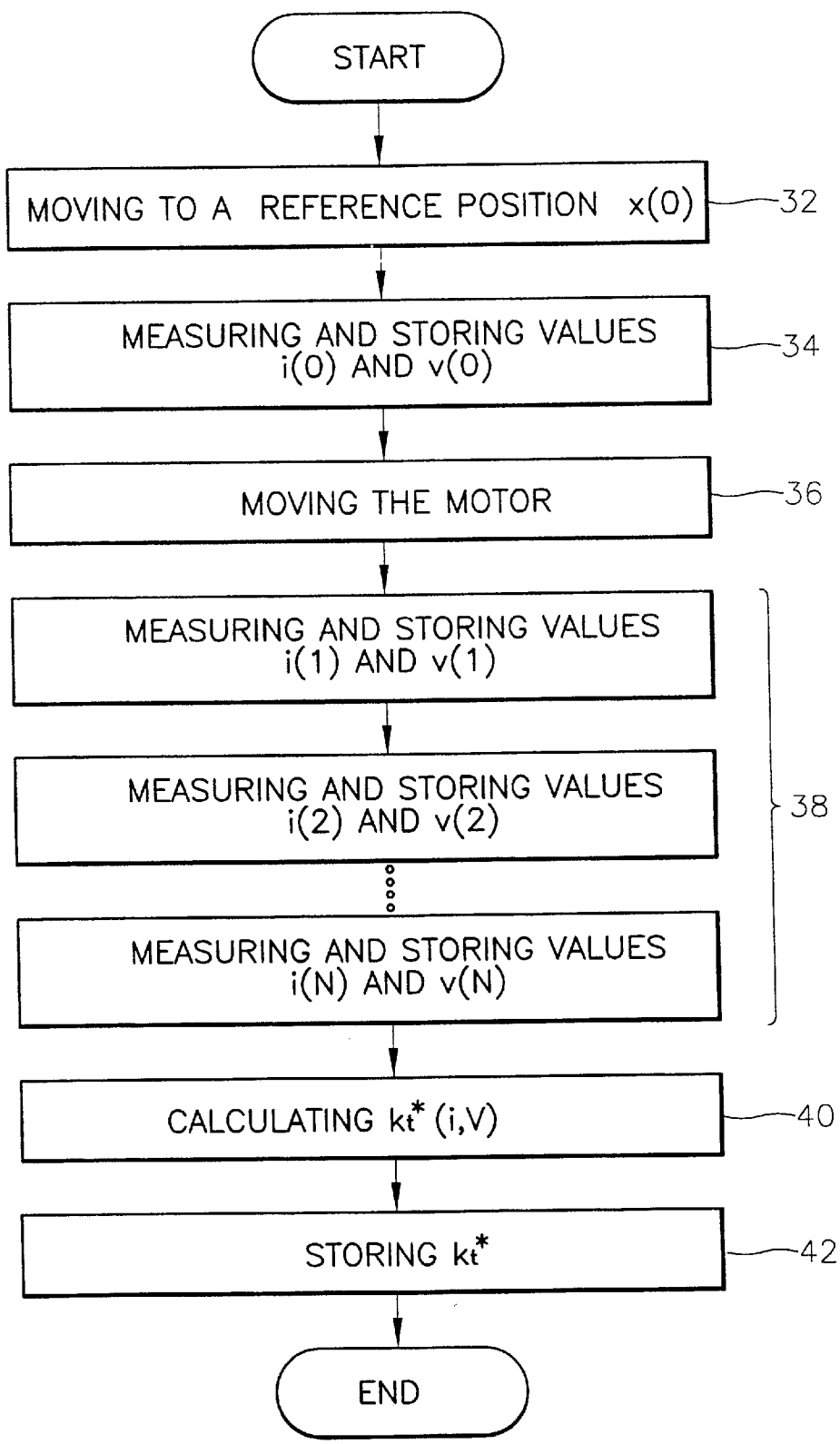

METHOD OF ESTIMATING MOTOR TORQUE CONSTANT

CLAIM OF PRIORITY

This application makes reference to, incorporates the same herein, and claims all benefits accruing under 35 U.S.C. §119 from an application entitled ESTIMATION METHOD FOR ACTUATOR TORQUE CONSTANT earlier filed in the Korean Industrial Property Office on Apr. 8, 1998, and there duly assigned Serial No. 98-1245 , a copy of which is annexed hereto.

BACKGROUND OF THE INVENTION

1. Field of the Invention

The present invention relates to a method of estimating a motor torque constant, and more particularly, to a method of estimating the motor torque constant using an input current of the motor and an output speed of the motor.

2. Description of the Related Art

In general, motors have been used in various types of electric power system such as a disk drive or an optical pickup drive. Typically, the motor is driven by using a motor torque constant which indicates the relationship between an output torque and an input current of the motor. Accordingly, the well-estimated motor torque constant properly represents characteristics of the motor. The motor torque constant may be used for estimating characteristics of the motor. The motor torque constant actually changes depending on an input or an output of the motor when the motor is accelerated. However, the motor torque constant is regarded as a constant value or is calculated to be proportional to a change of a position of the motor. Thus, the motor torque constant can not represent characteristics of the motor.

U.S. Pat. No. 5,675,230 for a Method and Apparatus for Dynamic Low Voltage Spindle Motor Operation issued to John discloses a high torque constant line-to-line phase configuration during spindle motor power up and a lower effective torque constant configuration once normal run speed operation, and shows that the spindle motor torque constant Ktx is represented by ounce-inch/ampere and explained with a function of rotor position. This reference does not consider the variation of a motor torque constant during accelerating the motor.

U.S. Pat. No. 5,598,081 for a Vector Control Method for Controlling Rotor Speed of an Induction Motor issued to Okamura et al discloses a primary current being fed to a induction motor. After an excitation current and a detected torque current are obtained from the primary current, a torque value representing the detected torque current is multiplied by a predetermined motor constant to calculate a deviation between the delay torque current and the detected torque current. The torque constant is expressed by correlated inductance/flux parameter. This reference fails to calculate the variation of the motor torque constant during accelerating the motor.

U.S. Pat. No. 5,447,414 for a Constant Air Flow Control Apparatus and Method issued to Nordby et al. discloses a torque constant relating to air flow, air pressure, torque characteristics and speed characteristics, but the reference fails to show the variation of the motor torque constant.

A conventional method of estimating motor torque constant assumes that when the motor is accelerated, the motor torque constant is proportional to a position change as the output of the motor, regardless of the input current of the motor.

I have noticed that the art, as indicated by the foregoing exemplars, fails to consider that the motor torque constant actually depends on the input current during acceleration of the motor. Thus, an accurate motor torque constant can not be obtained by the conventional method. Moreover, I have found that an optimum value of the proportional constant $K_0$ of the conventional method must be determined through trial and error, which consumes too much time for tuning a motor during development of the motor.

SUMMARY OF THE INVENTION

To solve the above problems, it is an object of the present invention to provide a method and circuit for more accurately estimating a motor torque constant.

It is another object to provide an method for improving the operational characteristics of a motor.

It is still object to provide an improved method for detecting a change in the motor torque constant.

It is yet another object to provide an improved method for calculating variations of the torque constant by using an electrical current input to a motor.

It is still yet another object to provide an improved method for minimizing error during tuning a motor.

It is further object to provide an improved method for accurately rotating a motor.

These and other objects may be achieved by using a current input to a motor and a representation of the rotational speed of the motor. The current and the speed of the motor is measured by sampling while the motor rotates. The motor torque constant (Kt*) is calculated by the following formula:

$$K_t^* = \frac{\sum_{1}^{N} i(k-1)[v(k) - v(k-1)]}{\sum_{1}^{N} i(k-1)^2}$$

where i(k) and v(k) respectively indicate the current and the speed of the motor at a sampling time 'k', and N indicates a natural number greater than 1.

BRIEF DESCRIPTION OF THE DRAWINGS

A more complete application of this invention, and many of the attendant advantage thereof, will be readily apparent as the same become better understood by reference to the following detailed description when considered in conjunction with the accompanying drawing in which like reference symbols indicate the same or similar components, wherein:

FIG. 3 is a flowchart showing a method for estimating a motor torque constant according to the principles of the present invention.

DETAILED DESCRIPTION OF THE PREFERRED EMBODIMENTS

Figure 1:
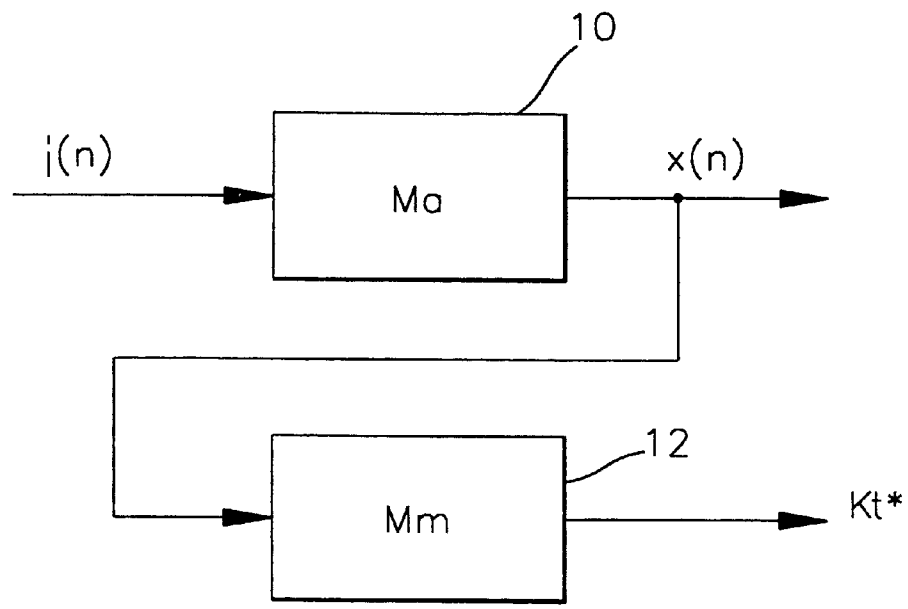
FIG. 1 is a block diagram of a conventional circuit for estimating a motor torque constant.

Turning now to the drawings, FIG. 1 is a block diagram of a conventional method of estimating a motor torque constant. A model motor 12 must receive a position value x(n) as an output of an actual motor 10 in order to estimate the motor torque constant. The motor torque constant $K_t^*$ estimated by the model motor 12 is proportional to the difference between a measured position x(N) of the motor and a reference position x(0) at sampling time N. Accordingly, the estimated motor torque constant $K_t^*$ is expressed by the following formula 1 as:

$$K_t^* = K_0[x(N)-x(0)] \quad (1)$$

where, $K_0$ is a proportionality constant.

The motor torque constant, however, actually depends on an input current during acceleration of the motor. Thus, the estimated motor torque constant obtained by the formula 1 is inaccurate. Also, an optimum value of the proportionality constant $K_0$ is determined through trial and error, which is a particularly time consuming chore for tuning a motor during development of the motor.

Figure 2:
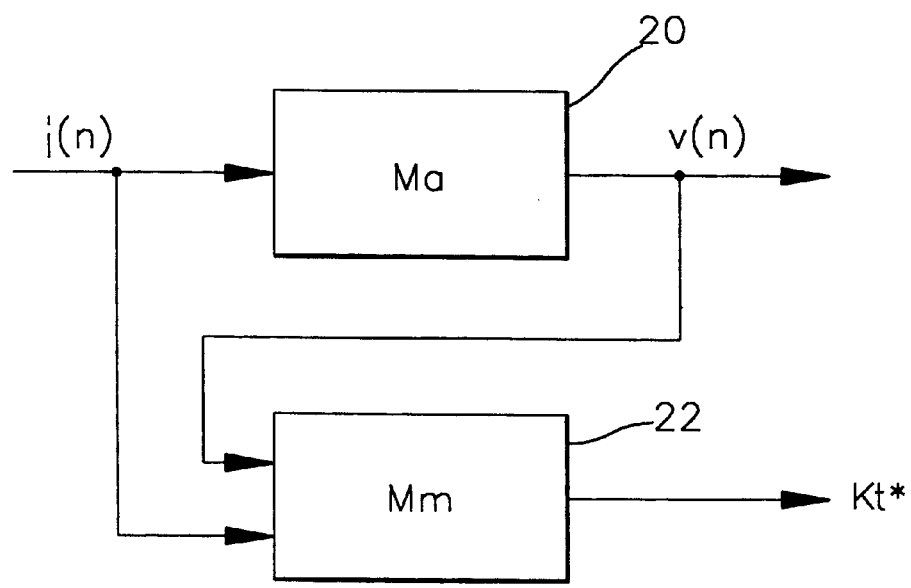
FIG. 2 is a block diagram of a circuit for estimating a motor torque constant according to the principles of the present invention.

FIG. 2 is a block diagram of a method of estimating a motor torque constant according to the principles of the present invention. A current i(n) is an input current of an actual motor 20 and a speed v(n) is an output speed of the motor. The speed v(n) may represent a rotational speed of a shaft of the actual motor. A model motor 22 receives both the current i(n) and the speed v(n). If the actual motor 20 rotates and an equivalent moment of inertia applied to the motor is not changed, then the motor torque constant is proportional to acceleration and inversely proportional to current. Thus, the motor torque constant $K_t^*(n)$ estimated at sampling time n can be expressed by formula 2 as:

$$K_t^*(n) = \frac{v(n) - v(n-1)}{i(n-1)} \quad (2)$$

Accordingly, the motor torque constant is influenced by any change in the motor speed. The respective motor torque constants $K_t^*(1), K_t^*(2) \ldots, K_t^*(n)$ expressed formula 2 can be calculated by sampling the instantaneous current i(n) and speed v(n) of the actual motor 20 for n times.

The overall characteristics of the motor can be obtained by integrating the instantaneous motor torque constants. To derive a final motor torque constant $K_t^*$ appropriate for the overall operational range of the motor, it is necessary to define an error function E(k) which is composed of the summation of the differences between the actual motor torque constant $K_t$ and the instantaneous motor torque constants $K_t^*(1), K_t^*(2), \ldots, K_t^*(n)$. Then, the final motor torque constant is determined so as to minimize the error function.

Meanwhile, the instantaneous motor torque constant $K_t^*(n)$ shown in formula 2 is inversely proportional to the current i(n) of the input of the actual motor. Thus, the noise amplitude during a low current input to the motor 20 is relatively higher than the amplitude of noise created when a low amplitude of current is input to the model motor 22. That is, when the electrical current applied to the motor is low, the estimated motor torque constant is less reliable. The error function is defined by multiplying the error in the instantaneous motor torque constant by the instantaneous input current value as a weighting factor. Here, the error function E(K) is expressed by Formula 3 as:

$$E(k) = i^2(0)[K_t - K_t^*(1)]^2 + i^2(1)[K_t - K_t^*(2)]^2 + \ldots + i^2(N-1)[K_t - K_t^*(N)]^2 \quad (3)$$

Formula 4 is obtained from Formulas 2 and 3 as:

$$E(k) = [K_t i(0) - (v(1)-v(0))]^2 + [K_t i(1) - (v(2)-v(1))]^2 + \ldots + [K_t i(N-1) - v(n) - v(N-1))]^2 \quad (4)$$

When the error function E(k) of Formula 4 is minimized, the value of $K_t$ is the final motor torque constant $Kt^*$. Thus, the motor torque constant $Kt^*$ as given by formula 5 is obtained by differentiating Formula 4 and setting $$\frac{\partial E(k)}{\partial (k_t)} = 0.$$

then, $$K_t^* = \frac{i(0)[v(1)-v(0)] + i(1)[v(2)-v(1)] + \ldots + i(N-1)[v(N)-v(N-1)]}{i^2(0) + i^2(1) + \ldots + i^2(N-1)} \quad (5)$$

The motor torque constant of formula 5 depends on the current and the speed at each sampling time.

FIG. 3 describes the details of a procedure of estimating the motor torque constant. The motor moves to a reference position x(0) in step 32. The current i(0) and the speed v(0) of the motor are measured at the reference position and stored in a memory (not shown) in step 34. While the motor rotates during acceleration in step 36, the current i(k) and the speed v(k) of the motor at each sampling time k are measured and stored in the memory until N items of data is stored in step 38. The motor torque constant is calculated by formula 5 by using the data stored in the memory in step 40 and the data stored in the memory in step 42.

The method of estimating the motor torque constant according to the present invention can be applied to various actuators which rotates motors. the motor torque constant is obtained by using a least mean square method for minimizing an error function while using a multiplicity of data measured while the motor rotates. Thus, the motor torque constant can be obtained more accurately and easily.

What is claimed is:

1. A method of estimating a motor torque constant, comprising the steps of:

detecting a plurality of instantaneous and variable electrical current values input to a motor and a plurality of instantaneous and variable speed values output from said motor at a plurality of sampling times during rotation of said motor; and estimating said motor torque constant characteristic of said motor on the basis of both a multiplicity of samples of said speed values and a multiplicity of samples of said current values.

2. The method of claim 1, further comprised of the step of storing said samples of said speed values and said samples of said current values in a memory.

3. The method of claim 1, further comprised of performing said step of estimating with a step of determining said motor torque constant $K_t^*$ on a basis of a first formula:

$$K_t^* = \frac{\sum_{1}^{N} i(k-1)[v(k) - v(k-1)]}{\sum_{1}^{N} i(k-1)^2},$$

where i(k) and v(k) respectively indicate said electrical current and said speed of the motor detected at a sampling time 'k', and N indicates a natural number greater than 1.

4. The method of claim 1, further comprised of the step of deriving an error function E(k) of a second formula:

$$E(k) = [K_t i(0) - (v(1)-v(0))]^2 + [K_t i(1) - (v(2)-v(1))]^2 + \ldots + [K_t i(N-1) - (v(N)-v(N-1))]^2,$$

by using s third formula $$K_t^*(n)=\{v(n)-v(n-1)\}\div i(n-1)$$

and a fourth formula $$E(k)=i^2(0)[K_t-K_t(1)]^2+i^2(1)[K_t-K_t^*(2)]^2+\ldots+i^2(N-1)[K_t-K_t^*(N)]^2,$$

where $i(k)$ and $v(k)$ indicate the electrical current and the speed of the motor at a sampling time 'k', $K_t$ is a reference value, and N indicates a natural number greater than 1.

5. The method of claim 4, wherein said error function varies as said motor torque constant varies depending on the number of said samples of said speed values and said current values.

6. The method of claim 1, further comprised of the step of deriving said motor torque constant $K_t^*$ by differentiating said error function by Kt and setting $dE(k)/dK_t=0$ on a basis of an equation:

$$K_t^* = \frac{\sum_{1}^{N} i(k-1)[v(k)-v(k-1)]}{\sum_{1}^{N} i(k-1)^2}$$

7. The method of claim 1, wherein said motor torque constant varies depending on the amount of said samples of said speed values and said current values.

8. The method of claim 1, wherein said electrical current values and said speed values are detected during acceleration of said motor.

9. The method of claim 1, wherein said electrical current values and said speed values are estimated during acceleration of said motor.

10. The method of claim 1, wherein said electrical current values and said speed values include reference values at a reference position of said motor.

11. The method of claim 1, wherein said motor constant characteristic is used for tuning said motor.

12. The method of claim 1, wherein said motor constant characteristic depends upon the number of said sampling times.

13. A method of determining a motor torque constant, comprising of the steps of:

storing a reference position of a motor;

allowing said motor to rotate;

measuring a plurality of electrical current values input to said motor and a plurality of speed values output from said motor at a plurality of sampling times during the rotation of said motor; and determining said motor torque constant in dependence upon said reference position, a multiplicity of samples of said current values, and a multiplicity of samples of said speed values.

14. The method of claim 13, further comprised of the step of deriving an error function E(k) of a first formula:

$$E(k)=[K_t i(0)-(v(1)-v(0))]^2+[K_t i(1)-(v(2)-v(1))]^2+\ldots+[K_t i(N-1)-(v(N)-v(N-1))]^2$$

by using a second formula $$K_t^*(n)=\{v(n)-v(n-1)\}\div i(n-1)$$

and a third formula $$E(k)=i^2(0)[K_t-K_t(1)]^2+i^2(1)[K_t-K_t^*(2)]^2+\ldots+i^2(N-1)[K_t-K_t^*(N)]^2,$$

where $i(k)$ and $v(k)$ indicate the electrical current applied to said motor and the speed of said motor at a sampling time 'k', $K_t$ is a reference, and N indicates a natural number greater than 1.

15. The method of claim 13, further comprised of the step of deriving said motor torque constant $K_t^*$ by differentiating said error function by Kt and setting $dE(k)/dKt=0$, on a basis of an equation:

$$K_t^* = \frac{\sum_{1}^{N} i(k-1)[v(k)-v(k-1)]}{\sum_{1}^{N} i(k-1)^2}.$$

* * * * *